United States Patent
Fujii

(10) Patent No.: US 8,695,057 B2
(45) Date of Patent: Apr. 8, 2014

(54) COMMUNICATIONS APPARATUS AND CONTROL METHOD THEREFOR

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 12/162,899

(22) PCT Filed: Mar. 16, 2007

(86) PCT No.: PCT/JP2007/056115
§ 371 (c)(1),
(2), (4) Date: Jul. 31, 2008

(87) PCT Pub. No.: WO2007/108545
PCT Pub. Date: Sep. 27, 2007

(65) Prior Publication Data
US 2009/0007226 A1  Jan. 1, 2009

(30) Foreign Application Priority Data
Mar. 20, 2006  (JP) ................. 2006-077401

(51) Int. Cl.
*G06F 17/00* (2006.01)
(52) U.S. Cl.
USPC ............ 726/1; 726/27; 380/200; 380/242; 713/150; 713/181
(58) Field of Classification Search
USPC .......... 713/150–181, 201; 380/200–242; 320/106; 726/1, 27; 326/8
See application file for complete search history.

(56) References Cited

U.S. PATENT DOCUMENTS

| | | | |
|---|---|---|---|
| 5,406,272 A * | 4/1995 | Jang | 340/7.37 |
| 6,025,695 A * | 2/2000 | Friel et al. | 320/106 |
| 7,173,651 B1 * | 2/2007 | Knowles | 348/207.1 |
| 7,596,226 B2 * | 9/2009 | Cherian | 380/277 |
| 2002/0147819 A1 | 10/2002 | Miyakoshi et al. | |
| 2003/0028810 A1 * | 2/2003 | Uematsu et al. | 713/201 |
| 2003/0100335 A1 * | 5/2003 | Gassho et al. | 455/552 |
| 2004/0122975 A1 * | 6/2004 | Lennestal et al. | 709/245 |
| 2004/0239772 A1 * | 12/2004 | Onishi et al. | 348/211.2 |

(Continued)

FOREIGN PATENT DOCUMENTS

| | | |
|---|---|---|
| CN | 1378405 A | 11/2002 |
| JP | 09-282561 A | 10/1997 |

(Continued)

OTHER PUBLICATIONS

Japanese Office Action, dated Nov. 9, 2012, issued by the Japanese Patent Office, in Japanese Application No. 2011-127643.

(Continued)

*Primary Examiner* — Christopher Brown
*Assistant Examiner* — Fahimeh Mohammadi
(74) *Attorney, Agent, or Firm* — Fitzpatrick, Cella, Harper & Scinto

(57) ABSTRACT

When exchanging communication parameter setting information on a wireless network, a communications apparatus selects between a first operation mode in which communications parameter information is exchanged with a specific communications apparatus and a second operation mode in which communications parameter information is exchanged with an unspecified number of communications apparatus. Depending on the selected operation mode, the communications apparatus control security upon holding the communications parameter information exchanged with the specific communications apparatus and the communications parameter information exchanged with the unspecified number of communications apparatus.

43 Claims, 16 Drawing Sheets

(56) References Cited

U.S. PATENT DOCUMENTS

| | | | |
|---|---|---|---|
| 2005/0021695 A1* | 1/2005 | Takamine | 709/220 |
| 2005/0066229 A1* | 3/2005 | Karaoguz et al. | 714/11 |
| 2005/0272371 A1* | 12/2005 | Komatsuzaki et al. | 455/41.2 |
| 2006/0026225 A1* | 2/2006 | Canali et al. | 709/200 |
| 2007/0115950 A1* | 5/2007 | Karaoguz et al. | 370/356 |

FOREIGN PATENT DOCUMENTS

| | | |
|---|---|---|
| JP | 11-008630 A | 1/1999 |
| JP | 11-68786 | 3/1999 |
| JP | 2003-051857 | 2/2003 |
| JP | 2004-328288 A | 11/2004 |
| JP | 2005-20112 | 1/2005 |
| JP | 2005-151258 A | 6/2005 |
| KR | 10-2002-0076195 | 10/2002 |
| KR | 10-2004-0111464 | 12/2004 |
| WO | 02067499 A1 | 8/2002 |
| WO | 03/085542 | 10/2003 |
| WO | 2006/027407 A1 | 3/2006 |

OTHER PUBLICATIONS

Japanese Office Action, issued Apr. 5, 2013, by the Japanese Patent Office, in Japanese Patent Application No. 2011-127643.

Office Action dated Aug. 5, 2013, issued by Japanese Patent Office, in Japanese Patent Application No. 2013-000727.

Notice on the First Office Action dated May 24, 2013, issued by the State Intellectual Property Office of the People's Republic of China, in Chinese Application No. 201110178725.6.

Chinese Office Action issued in Counterpart Chinese Application No. 201110178679.X dated Dec. 4, 2013.

* cited by examiner

FIG. 4B

| PARTY-MODE COMMUNICATIONS PARAMETER SETTING INFORMATION AREA | |
|---|---|
| | TEMPORARY COMMUNICATIONS PARAMETERS 404 |
| SSID | Network_IDNo.999 |
| MODE | AD HOC COMMUNICATIONS |
| AUTHENTICATION | OPEN |
| CRYPTOGRAPH | WEP104 |
| ENCRYPTION KEY | Abcdef445U123 |
| INDEX | 1 |
| CHANNEL | 5 |
| DEVICE TYPE | CAMERA |
| IP ADDRESS SETTING | AUTOIP |
| MANAGEMENT TERMINAL MAC ADDRESS | 00 : 23 : EF : CD : 43 : AB |

F I G. 11
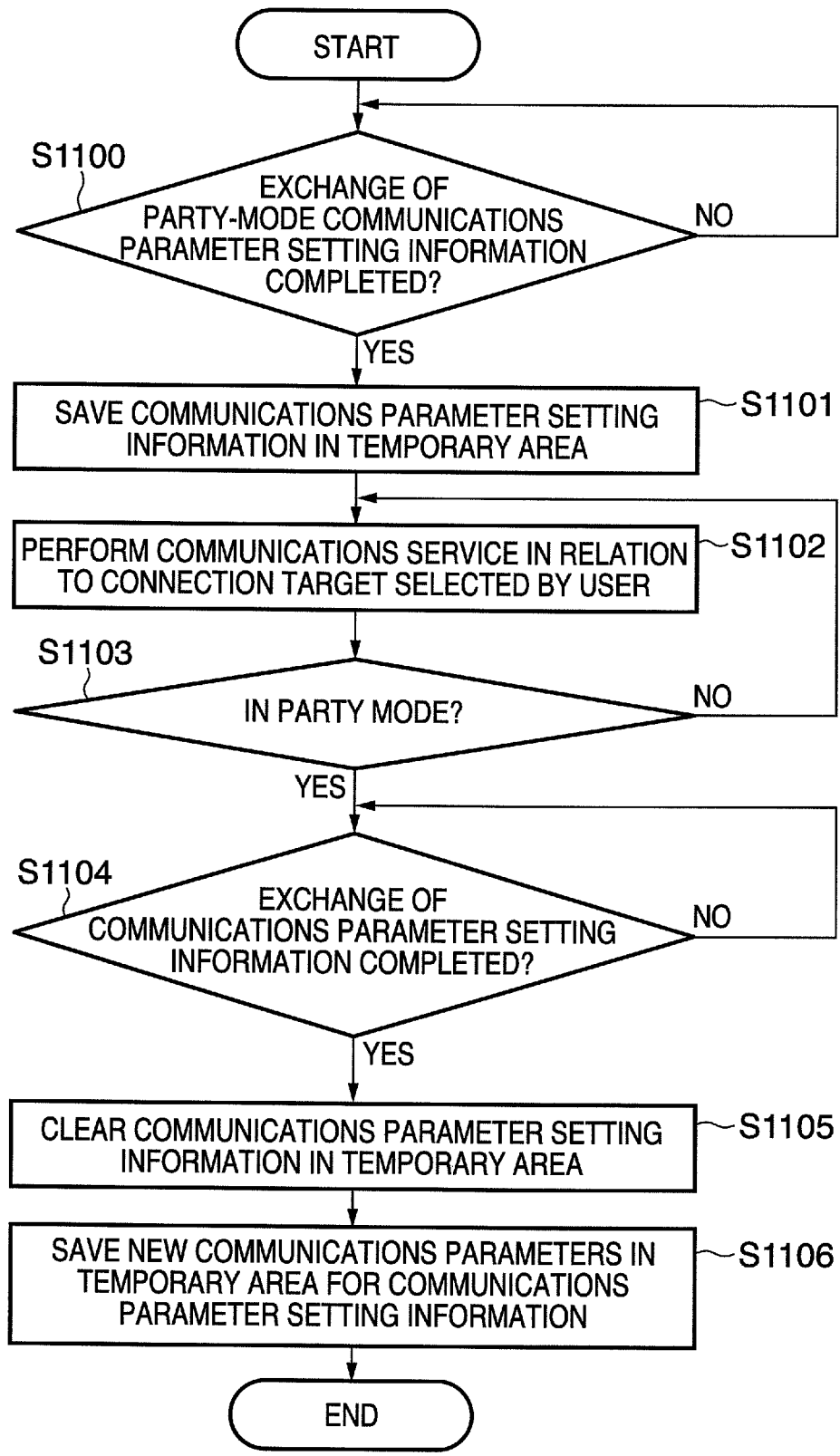

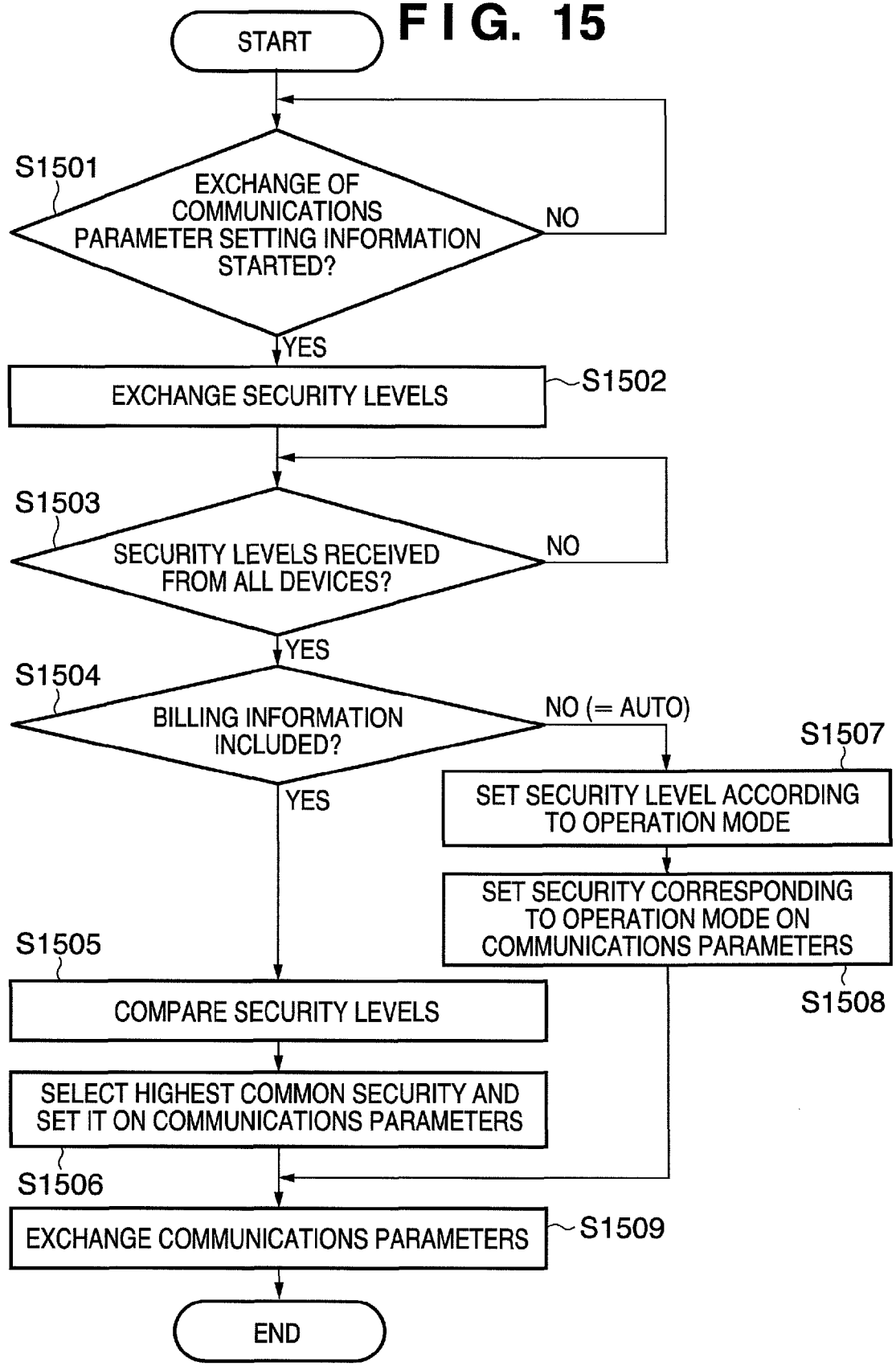

US 8,695,057 B2

COMMUNICATIONS APPARATUS AND CONTROL METHOD THEREFOR

TECHNICAL FIELD

The present invention relates to a technique for setting communications parameter information.

BACKGROUND ART

Methods are proposed which automatically set wireless communications parameters such as the network identifier (SSID), encryption methods, encryption key, authentication methods, and authentication key, which are said to be troublesome for users to set. Regarding automatic wireless LAN settings, for example, a method for transferring wireless parameter settings for an access point (relay station) and station (terminal) safely and automatically from the access point to the station by simple operations has actually been implemented as a product.

Also, in carrying out wireless communication, products which assume various forms of usage have been implemented, including direct wireless communications (ad hoc communications) with specific or unspecified partners without an intervening access point.

Detailed methods for secure data communications have been proposed because wireless parameter settings include network security information. For example, whether or not data transmission is permitted is determined based on the attribute values attached to the data, as well as on access policies. Also, when receiving data, whether or not the data can be stored is determined based on the attribute values and policies. If it is possible, the received data is stored. In this way, Patent Document 1 describes a secure data storage operation.

Also, proposals have been made in order to address the need to control information to be distributed, either on a per-user basis or according to the place of use. Patent Document 2 describes a system in which a management apparatus which has setting information (profiles) compatible with a plurality of networks provides information to each terminal according to the user of the terminal or the place of use, so that the user can make a desired connection using the setting information without being conscious of the network.

Incidentally, Patent Documents 1 and 2 are as follows.
Patent Document 1: U.S. Publication No. US-2003-028810 (Japanese Patent Laid-Open No. 2003-051857)
Patent Document 2: Japanese Patent Laid-Open No. 2005-020112

The above technique makes it possible to store safe data and to switch communications parameter setting information from one user to another on the network managed by the management apparatus described above. However, with future increases in the need for communications on unmanaged networks such as ad hoc networks, forms of communications will become complicated, and it will become necessary to exchange communications parameter setting information in multiple operation modes between specified wireless communications apparatuses or between unspecified wireless communications apparatuses. In that case, although from the viewpoint of security the user wants to control the way he/she stores the communications parameter setting information, such as permanently or temporarily, according to the operation mode, currently the switching of the communications parameter setting information is left to the user's manual control, which has involved a complicated operation. Also, there have been problems in terms of security and operation. For example, the user may forget to erase temporary communications parameter setting information and continue to use it.

DISCLOSURE OF INVENTION

The present invention realizes to make it possible to set the security of communications parameter setting information depending on whether communications are conducted by a specific communications apparatus or an unspecified number of communications apparatuses, without complicated operations.

According to one aspect of the present invention, there is provided a communications apparatus which sets communications parameter information, comprising: selection means for selecting one of a first operation mode in which communications parameter information is set in relation to a specific communications apparatus and a second operation mode in which communications parameter information is set in relation to an unspecified number of communications apparatus; and control means for controlling security of said communications parameter information which is set in relation to said specific communications apparatus or said unspecified number of communications apparatus, according to an operation mode selected by said selection means.

According to another aspect of the present invention, there is provided a control method for a communications apparatus which sets communications parameter information comprising: a selection step of selecting one of a first operation mode in which communications parameter information is set in relation to a specific communications apparatus and a second operation mode in which communications parameter information is set in relation to an unspecified number of communications apparatus; and a control step of controlling security of said communications parameter information which is set in relation to said specific communications apparatus or said unspecified number of communications apparatus, according to an operation mode selected by said selection step.

Further features of the present invention will become apparent from the following description of exemplary embodiments (with reference to the attached drawings).

BRIEF DESCRIPTION OF DRAWINGS

FIGS. 4A and 4B are diagrams showing an exemplary organization of operation modes and communications parameter setting information areas according to the first embodiment;

FIG. 11 is a flowchart showing the process of achieving temporality by exchanging and holding communications parameter setting information again in PARTY mode;

FIG. 15 is a flowchart showing the process of determining a security level depending on the presence or absence of billing information.

BEST MODE FOR CARRYING OUT THE INVENTION

The best mode for carrying out the invention will be described in detail below with reference to the drawings.

First Embodiment

Figure 1:
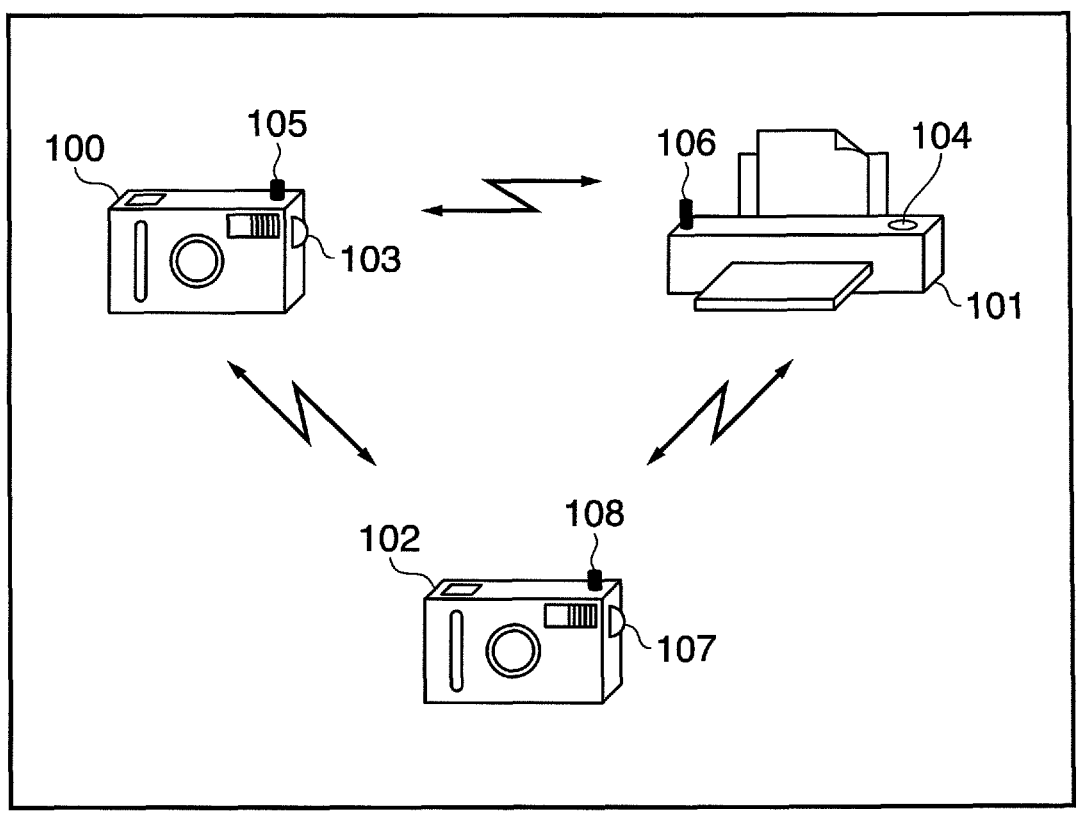
FIG. 1 is a diagram showing an exemplary configuration of a wireless communications system according to a first embodiment.

FIG. 1 is a diagram showing an exemplary configuration of a wireless communications system according to a first embodiment. As shown in FIG. 1, device A is a digital camera 100. It has wireless LAN capabilities as wireless communications capabilities 105, and it constructs a network in communications parameter setting mode when a communications parameter setting start button 103 is pressed. Device B is a printer 101. It has wireless LAN capabilities as wireless communications capabilities 106, and it constructs a network in communications parameter setting mode when a communications parameter setting start button 104 is pressed. Device C is a digital camera 102. It has wireless LAN capabilities as wireless communications capabilities 108, and it constructs a network in communications parameter setting mode when a communications parameter setting start button 107 is pressed.

Operation modes in the communications parameter setting mode and a method for setting them will be described later.

Next, configurations of wireless communications apparatus A and B will be described with reference to FIGS. 2 and 3. Device C has the same configuration as device A, and thus description thereof will be omitted.

Figure 2:
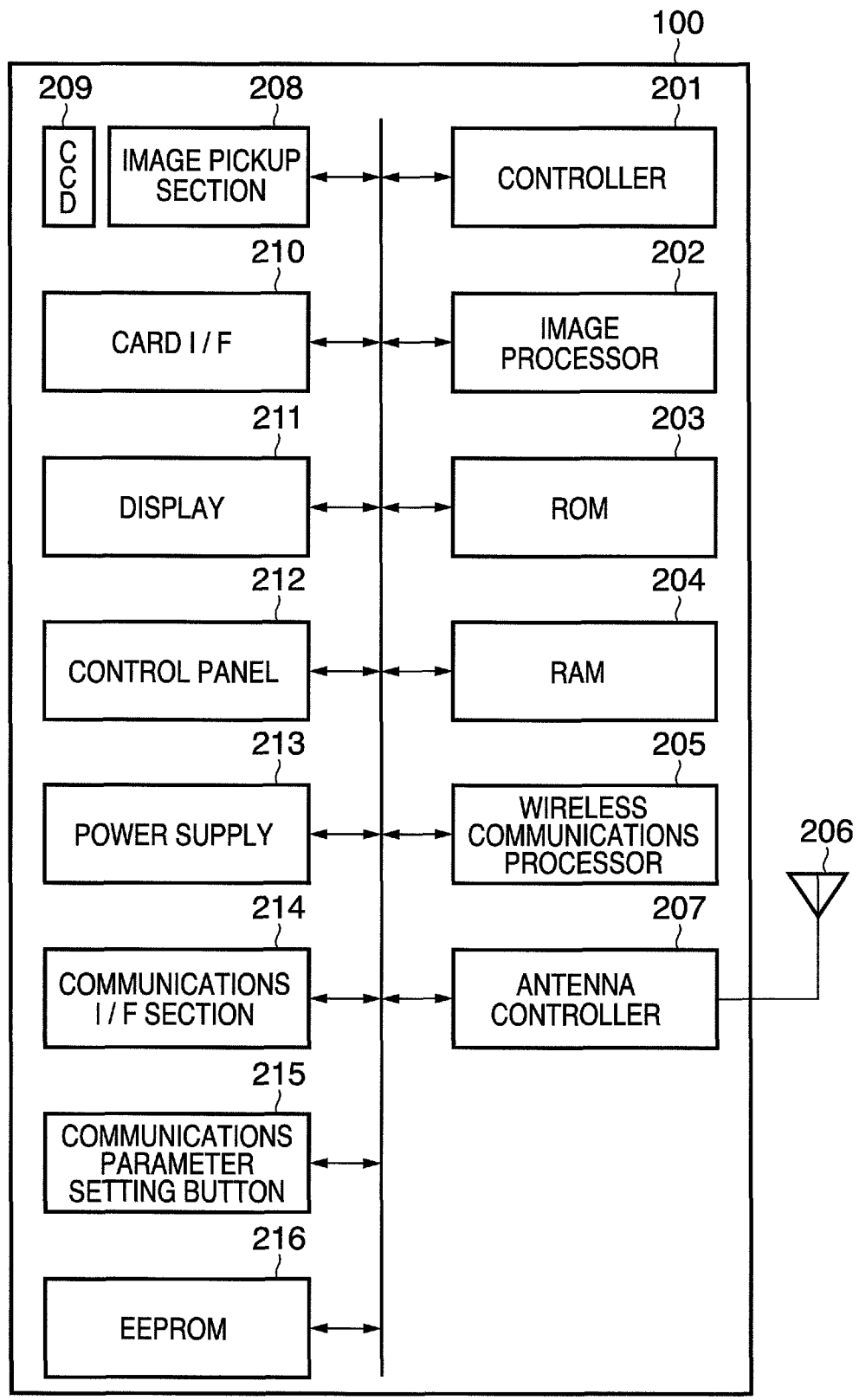
FIG. 2 is a schematic block diagram showing an exemplary configuration of device A (digital camera 100)

FIG. 2 is a schematic block diagram showing an exemplary configuration of device A (digital camera 100). In FIG. 2, reference numeral 201 denotes a controller which controls the digital camera 100, 202 denotes an image processor, 203 denotes a ROM which stores control instructions (programs) and control data, and 204 denotes a RAM. The RAM 204 prestores setup communications parameters used to form a network for communications parameter setting. Reference numeral 205 denotes a wireless communications processor which controls communications for a wireless LAN. Reference numeral 206 denotes an antenna and 207 denotes an antenna controller.

Reference numeral 208 denotes an image pickup section which captures a pixel signal from a CCD 209. Reference numeral 210 denotes a card interface which controls a recording media card used to store picked-up images and setting information and 211 denotes a display. Reference numeral 212 denotes a control panel which contains buttons used to give photo-taking, playback, setting, and other commands. Reference numeral 213 denotes a power supply including a secondary cell. Reference numeral 214 denotes a communications interface section used for communications other than wireless communications. It is, for example, a USB, IEEE 1394, or other wired interface. Reference numeral 215 denotes a communications parameter setting start button used to start communications parameter setting. Reference numeral 216 denotes an EEPROM used to store communications parameters. It should be noted that the communications parameters are stored in the EEPROM, however, may be stored in other memories such as a Flash ROM.

Figure 3:
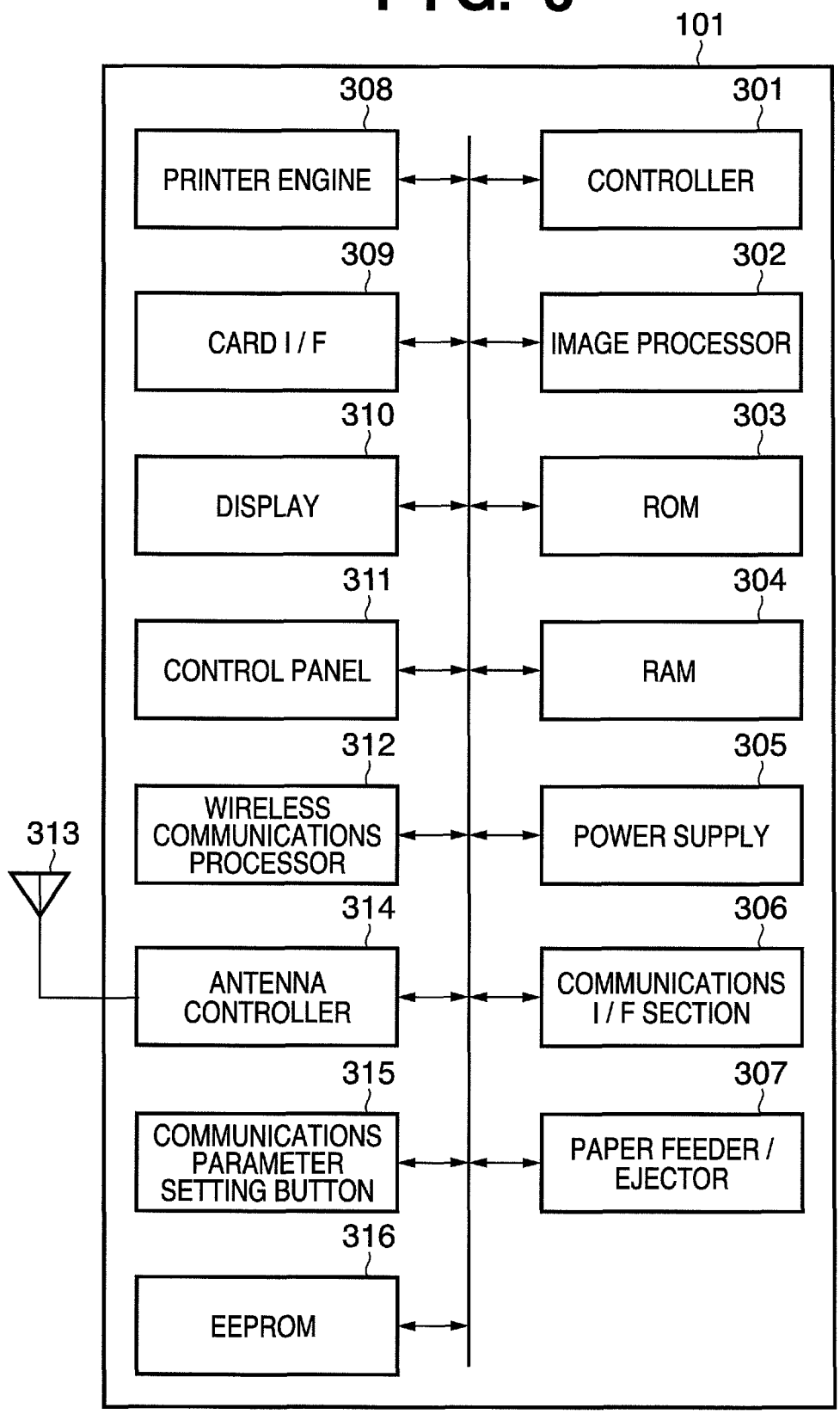
FIG. 3 is a schematic block diagram showing an exemplary configuration of device B (printer 101)

FIG. 3 is a schematic block diagram showing an exemplary configuration of device B (printer 101). In FIG. 3, reference numeral 301 denotes a controller which controls the printer 101, 302 denotes an image processor, 303 denotes a ROM which stores control instructions (programs) and control data, 304 denotes a RAM, and 305 denotes a power supply. The RAM 304 prestores setup communications parameters used to form a network for communications parameter setting. Reference numeral 306 denotes a communications interface section used for communications other than wireless communications. It is, for example, a USB, IEEE 1394, or other wired interface.

Reference numeral 307 denotes a paper feeder/ejector which feeds/ejects printer paper. Reference numeral 308 denotes a printer engine which controls electrophotographic or inkjet printing. Reference numeral 309 denotes a card interface which controls a recording media card used to store images and 310 denotes a display. Reference numeral 311 denotes a control panel which contains menu, setting, and other buttons. Reference numeral 312 denotes a wireless communications processor which controls communications for a wireless LAN. Reference numeral 313 denotes an antenna and 314 denotes an antenna controller. Reference numeral 315 denotes a communications parameter setting start button used to start communications parameter setting. Reference numeral 316 denotes an EEPROM used to store communications parameters. It should be noted that the communications parameters are stored in the EEPROM, however, may be stored in other memories such as a Flash ROM.

Next, communications parameters which are set in communications parameter setting processes in operation modes of each device will be described with reference to FIGS. 4A and 4B. Available operation modes include an AUTO mode in which communications parameter setting information is set automatically between two devices and a PARTY mode in which communications parameter setting information is set automatically among three or more devices.

Figure 4A:
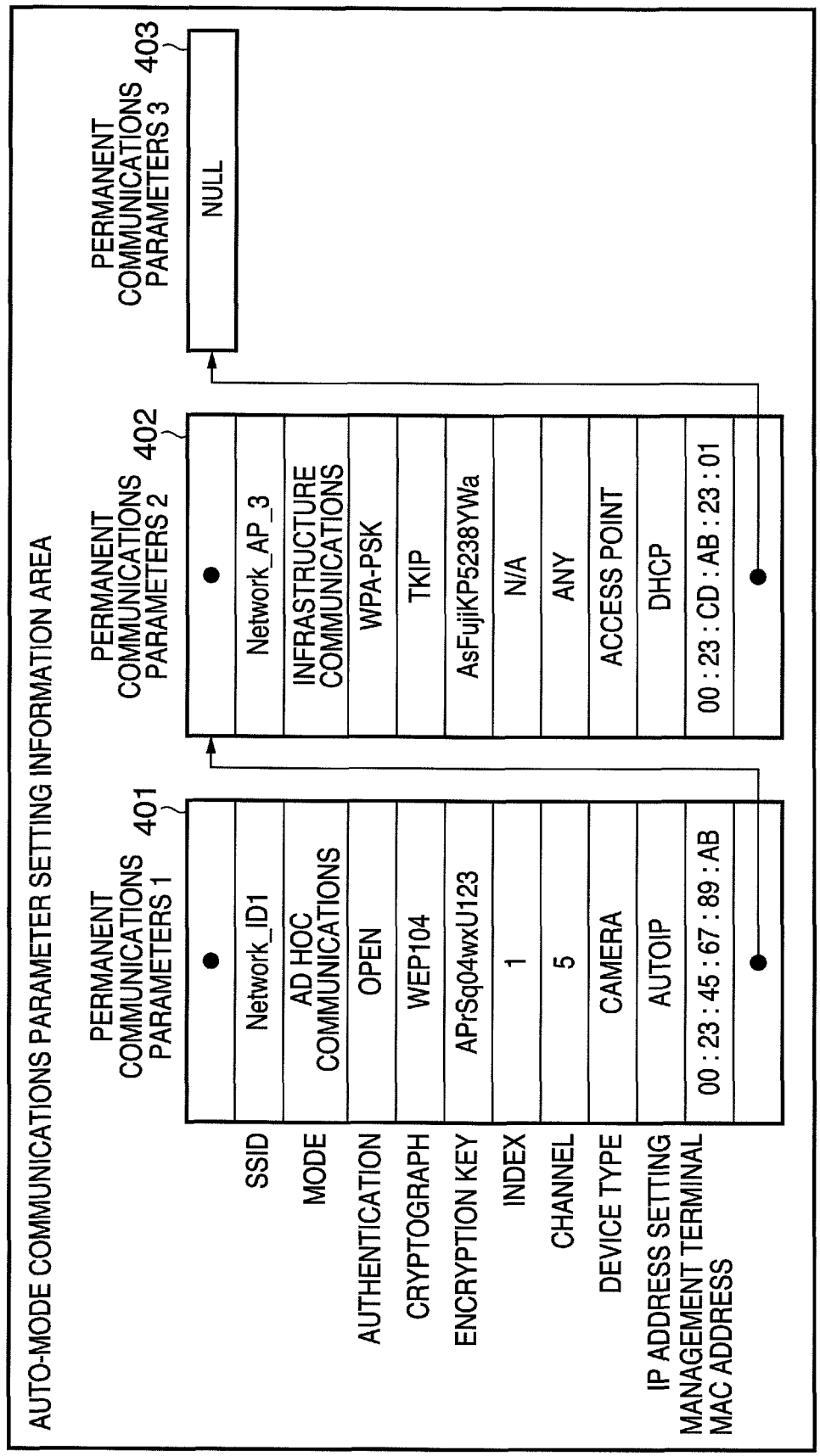

FIGS. 4A and 4B are diagrams showing an exemplary organization of operation modes and communications parameter setting information areas according to the first embodiment. Incidentally, the communications parameters are stored in the EEPROM 216 of the digital cameras 100 and 102 and in the EEPROM 316 of the printer 101.

As shown in FIGS. 4A and 4B, in AUTO operation mode, the communications parameters are stored as permanent communications parameters in AUTO-mode communications parameter setting information areas. In this example, permanent communications parameters 1 and 2 are already stored in AUTO-mode communications parameter setting information areas 401 and 402.

In PARTY operation mode, the communications parameters are stored as temporary communications parameters in PARTY-mode communications parameter setting information areas. In this example temporary communications parameters are already stored in a PARTY-mode communications parameter setting information area 404. The communications parameters stored in the AUTO-mode communications parameter setting information areas can be erased by user action. Otherwise, they are not erased.

Incidentally, the information held in the areas described above include, SSID, Mode, Authentication, Cryptograph, Encryption key, Index, Channel, Device type, IP address setting, Management terminal MAC address, and Pointer. SSID is a network identifier needed for wireless LAN connection. Mode is information which indicates either an infrastructure mode or ad hoc mode. Authentication is information which represents an authentication type. Cryptograph is information which represents the type of encryption key. Index is an index of the key. Channel is information which represents a communications frequency. Device type is information which represents the type of remote device. IP address setting is information which represents the class of IP address. Management terminal MAC address is the MAC address of a remote terminal. Pointer is a link to the next area. The last field of the link contains a null code 403.

Now description will be given of a process in which the digital camera 100 receives communications parameter setting information from the digital camera 102 with the above configuration when the operation mode of the digital cameras 100 and 102 is AUTO.

Figure 5:
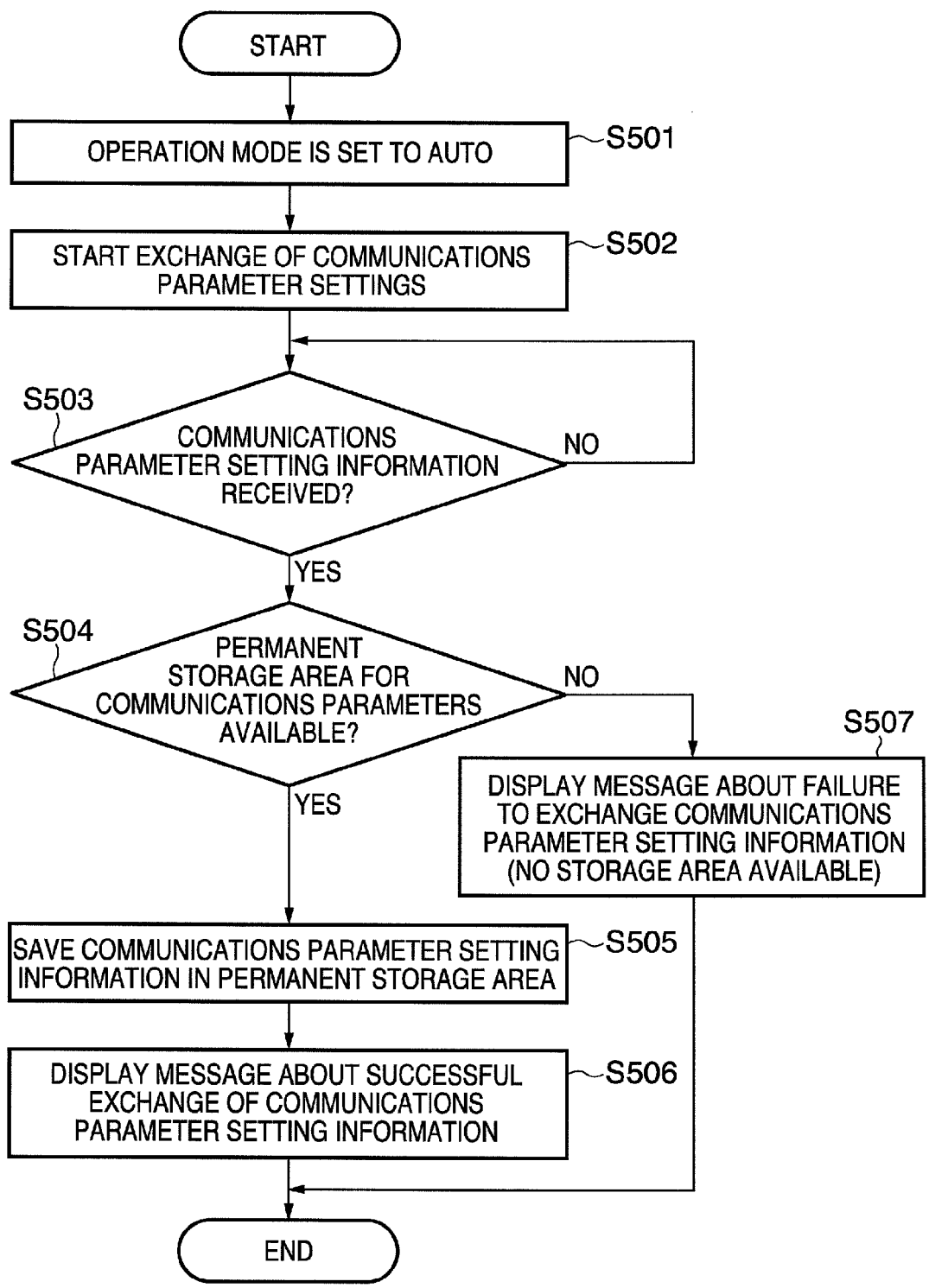
FIG. 5 is a flowchart showing the process of receiving communications parameter setting information in AUTO operation mode.

FIG. 5 is a flowchart showing the process of receiving communications parameter setting information in AUTO operation mode. The user first sets the operation mode of the digital camera 100 to AUTO (S501) by pressing its communications parameter setting start button 103. At the same time, exchange of communications parameter settings is started (S502). The digital camera 100 waits for communications parameter setting information to be received from the digital camera 102 (S503). When communications parameter setting information is received, since the digital camera 100 is operating in AUTO operation mode, the digital camera 100 checks whether an AUTO-mode communications parameter setting information area is available to store the communications parameter setting information (S504).

If the AUTO-mode communications parameter setting information area 403 in FIG. 4A is empty, the received communications parameter setting information is stored in it as permanent communications parameters 3 (S505). The digital camera 100 displays a message on the display 211 stating that the exchange of communications parameter setting information has been successful (S506), and finishes processing.

If there is no empty AUTO-mode communications parameter setting information area, the digital camera 100 displays a message on the display 211 stating that the exchange of communications parameter settings has failed because no empty area is available (S507), and finishes processing. When no area is available, the communications parameter setting information may be stored in a temporary area.

Figure 6:
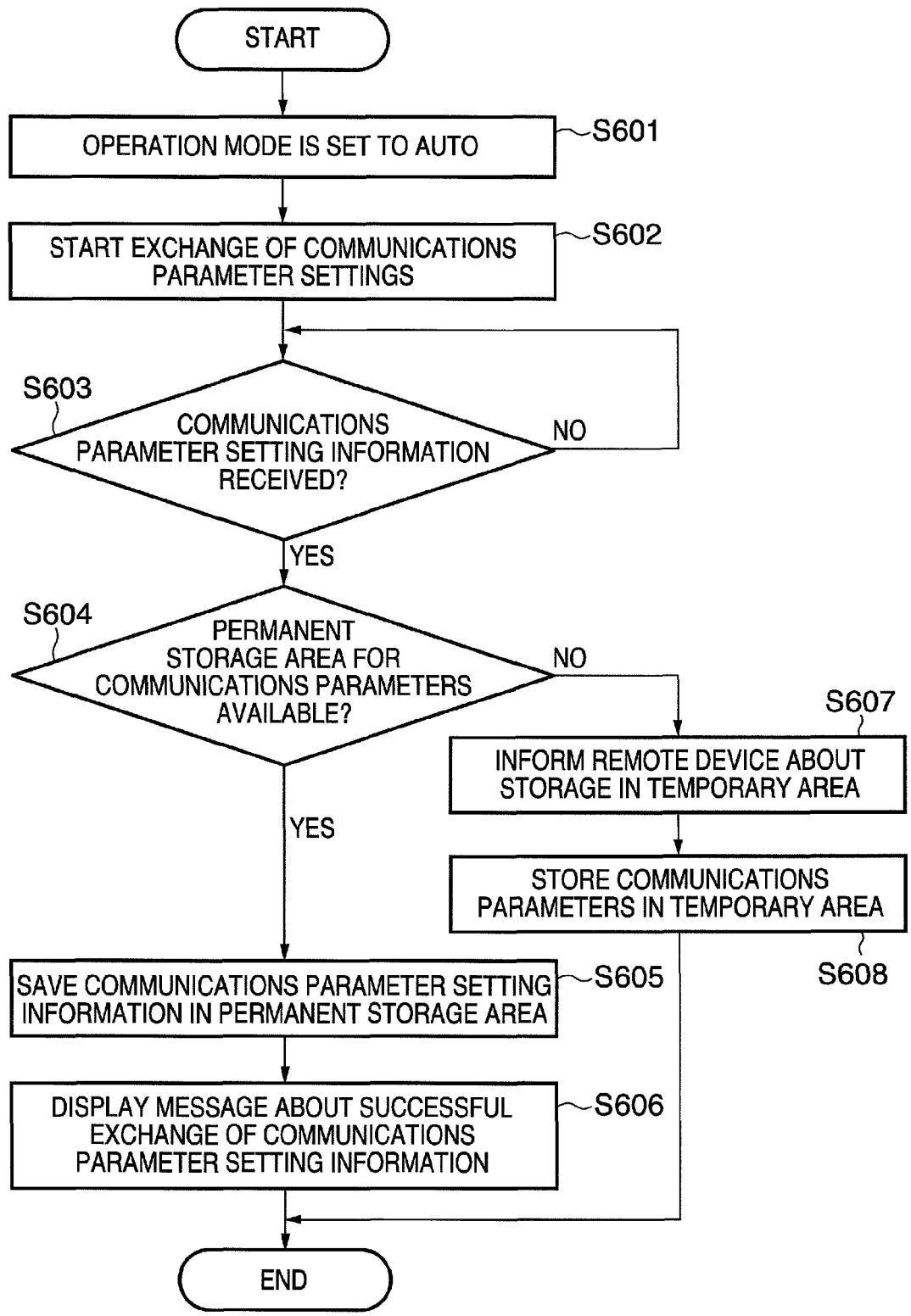
FIG. 6 is a flowchart showing the process of storing information in a temporary area when there is no empty AUTO-mode communications parameter setting information area.

FIG. 6 is a flowchart showing the process of storing information in a temporary area when there is no empty AUTO-mode communications parameter setting information area. Steps S601 to 606 in FIG. 6 are the same as Steps S501 to 506 in FIG. 5, and thus only processes in Step S607 and later will be described here.

If it is found in Step S604 that there is no empty AUTO-mode communications parameter setting information area, the digital camera 100 informs the remote device that communications parameters will be stored in a temporary area (S607), stores the communications parameters in the temporary area (S608), and finishes processing.

In this way, by using a temporary area even in AUTO operation mode, it is possible to continue communications without causing an error even if no AUTO-mode communications parameter setting information area is available.

Next, description will be given of a process in which communications parameter settings are exchanged among the digital camera 100, printer 101, and digital camera 102 in PARTY operation mode. Here, a process in which the digital camera 100 receives communications parameter setting information from the printer 101 will be described with reference to FIG. 7.

Figure 7:
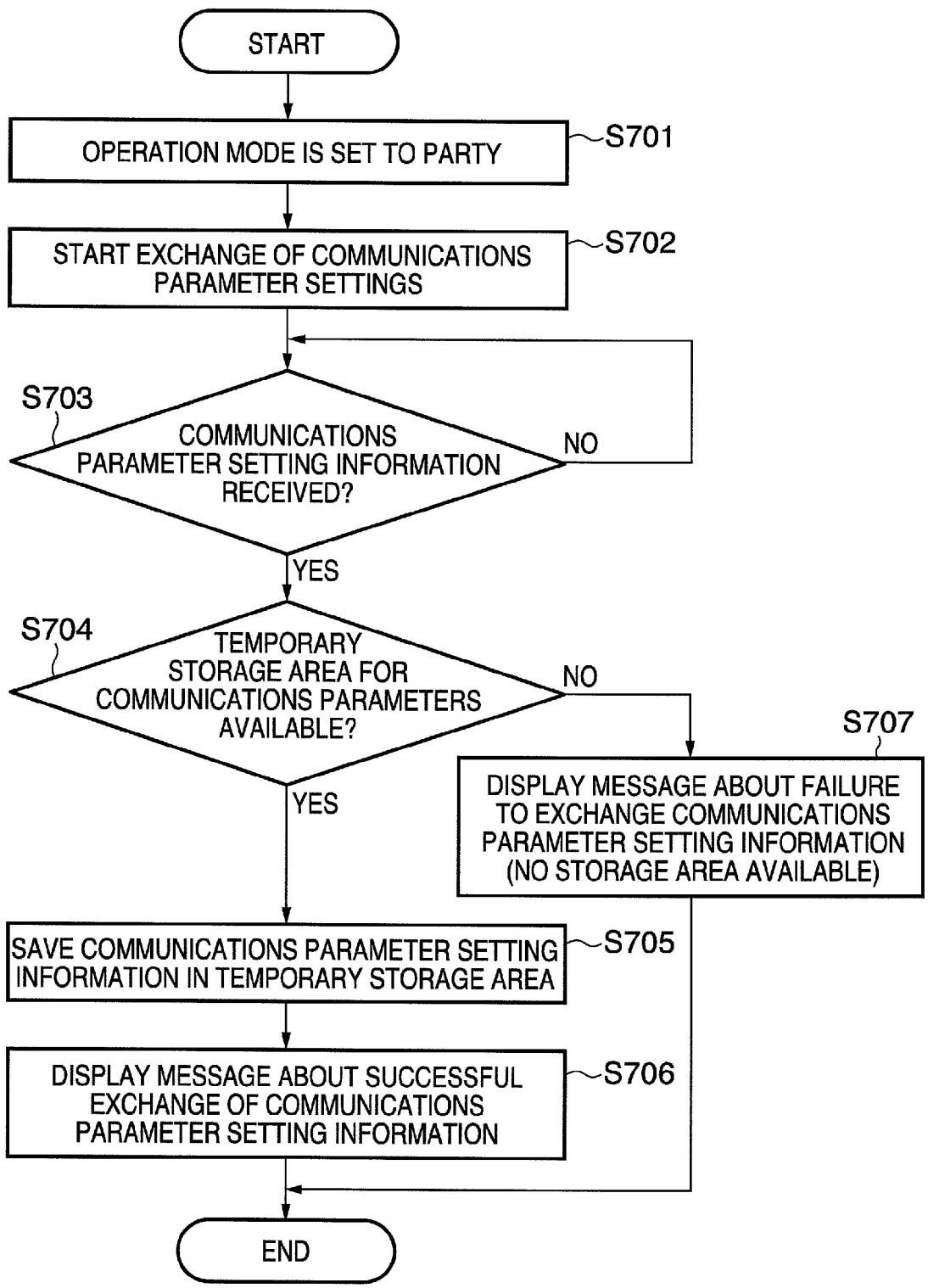
FIG. 7 is a flowchart showing the process of exchanging communications parameter settings in PARTY operation mode.

FIG. 7 is a flowchart showing the process of exchanging communications parameter settings in PARTY operation mode. The user first sets the operation mode of the digital camera 100 to PARTY mode (S701) by pressing its communications parameter setting start button 103. At the same time, exchange of communications parameter settings is started (S702). The digital camera 100 then waits for communications parameter setting information to be received from the printer 101 (S703). When communications parameter setting information is received, since the digital camera 100 is operating in PARTY mode, the digital camera 100 checks whether a PARTY-mode communications parameter setting information area is available for use to store the communications parameters (S704).

If the PARTY-mode communications parameter setting information area in FIG. 4B is empty, the received communications parameter setting information is stored in the area 404 as temporary communications parameters (S705). The digital camera 100 then displays a message on the display 211 stating that the exchange of communications parameter setting information has been successful (S706), and finishes processing.

On the other hand, if the PARTY-mode communications parameter setting information area is already in use, the digital camera 100 displays a message on the display 211 stating that the exchange of communications parameter settings has failed because no empty area is available (S707) to save the information, and finishes processing.

Next, description will be given of methods for achieving temporality of communications parameter setting information by automatically clearing the communications parameter setting information held in the area 404 in PARTY mode. It should be noted that the communications parameter setting information stored in the PARTY-mode communications parameter setting information area is cleared (erasing), and information stored in the AUTO-mode communications parameter setting information areas is not cleared.

As a first method, description will be given of a method for clearing the communications parameter setting information held as temporary communications parameters of the digital camera 100, in synchronization with power control.

Figure 8:
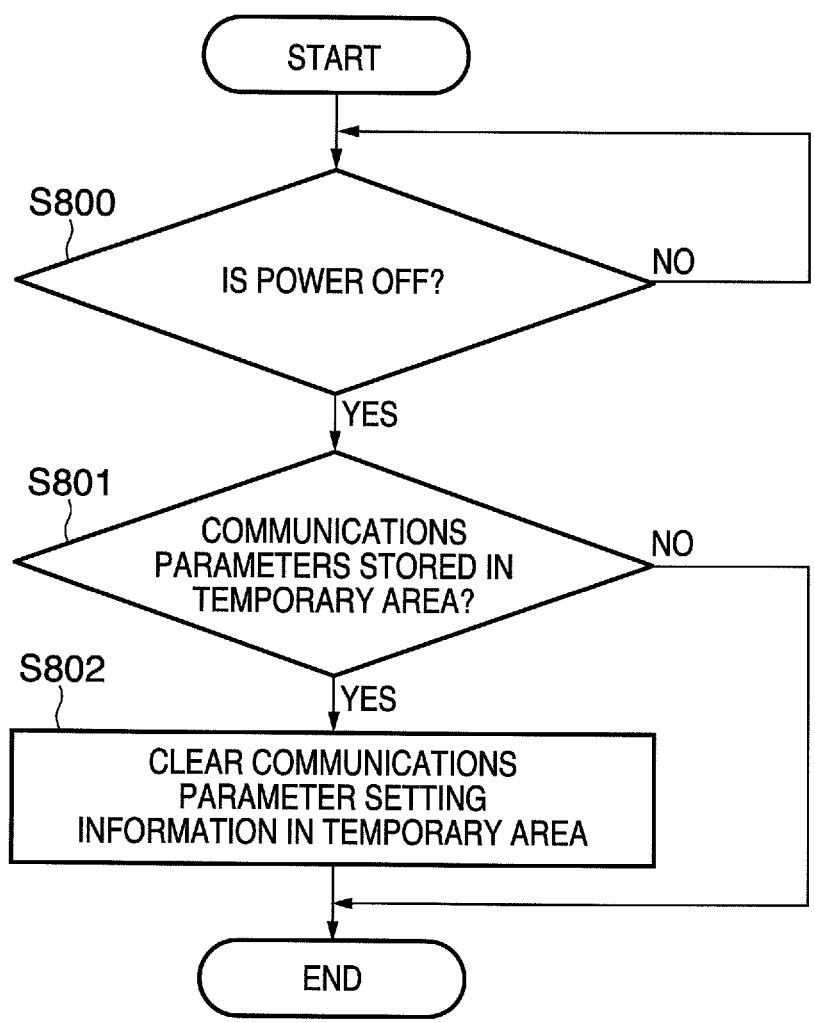
FIG. 8 is a flowchart showing the process of achieving temporality in synchronization with power control.

FIG. 8 is a flowchart showing the process of achieving temporality in synchronization with power control. First, it is checked whether the digital camera 100 is powered off (S800). If the digital camera 100 is powered off, it is checked whether communications parameter setting information is stored in the area 404 (S801). If it is stored, the information stored in the area 404 is cleared completely (S802).

In this way, temporality is achieved by turning off the power. Although only turn-off of power has been described here, the same effect can be obtained by clearing the area 404 at power-on.

Next, as a second method, description will be given of a method for clearing the communications parameter setting information held as temporary communications parameters of the digital camera 100 after a lapse of a certain period of time.

Figure 9:
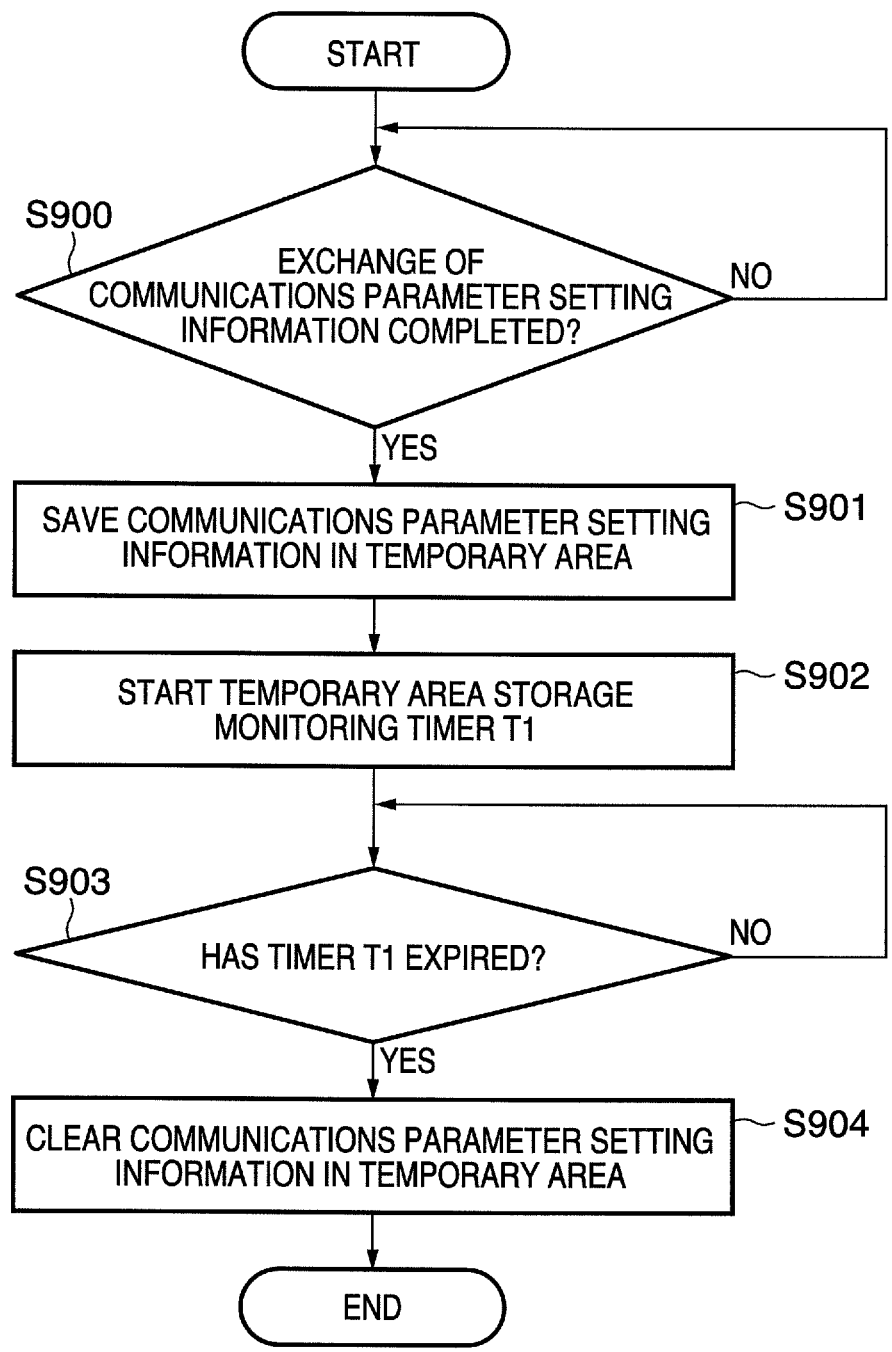
FIG. 9 is a flowchart showing the process of achieving temporality when a timer expires (at a preset time)

FIG. 9 is a flowchart showing the process of achieving temporality when a timer expires (at a preset time). First, the digital camera 100 checks whether exchange of communications parameter setting information in PARTY mode has been completed (S900). After completion of the exchange, the communications parameter setting information is saved in the area 404 (S901). At the same time, a temporary area storage monitoring timer T1 is started (S902). The digital camera 100 waits for the timer T1 to expire (S903). When the timer T1 expires, the communications parameter setting information stored in the area 404 is cleared (S904).

Next, as a third method, description will be given of a method for clearing the communications parameter setting information held as temporary communications parameters of the digital camera 100 after completion of a communications service.

Figure 10:
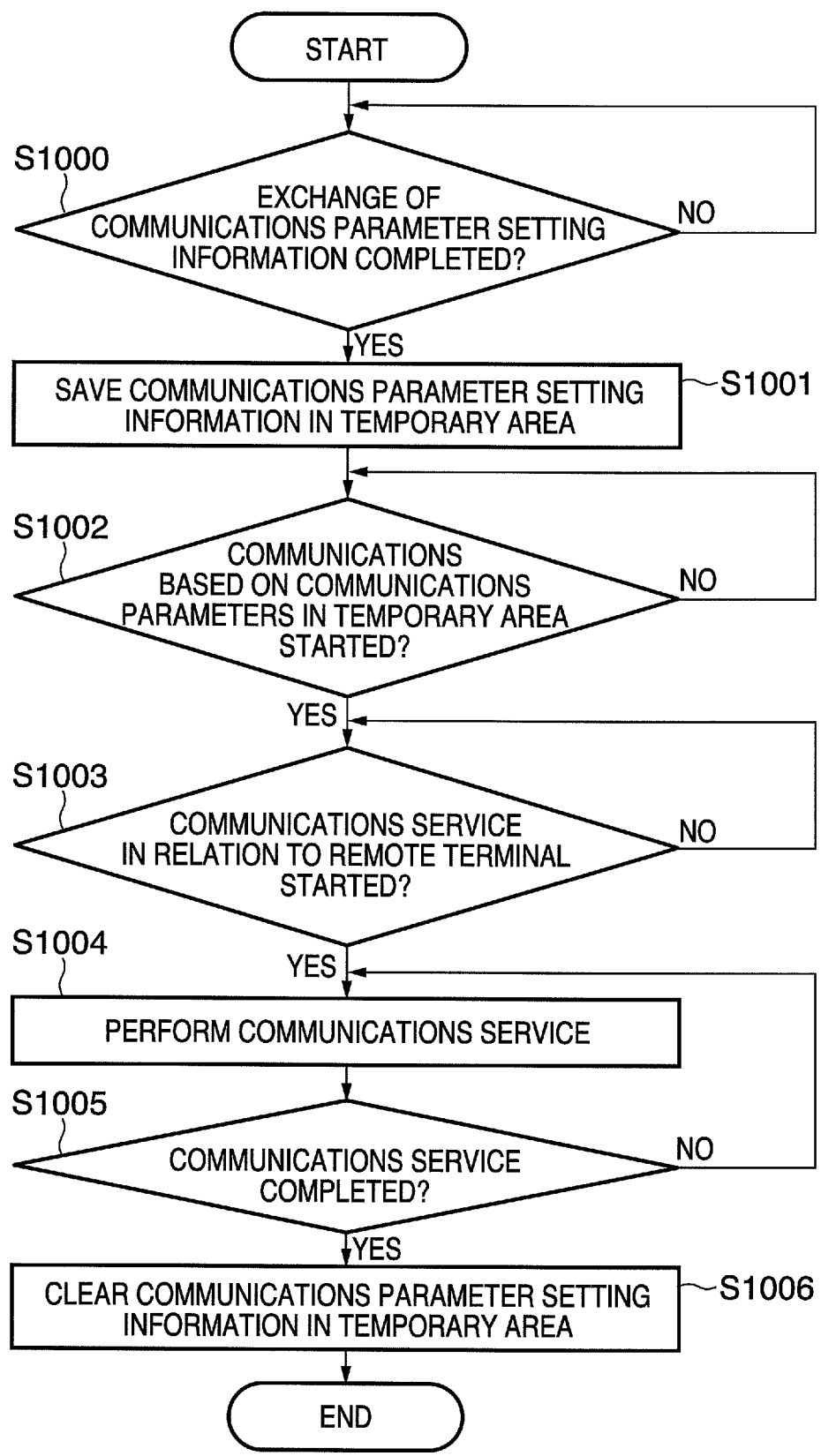
FIG. 10 is a flowchart showing the process of achieving temporality when services have been performed by devices connected wirelessly using communications parameter setting information.

FIG. 10 is a flowchart showing the process of achieving temporality as triggering service execution completion between devices connected wirelessly using communications parameter setting information. First, the digital camera 100 checks whether exchange of communications parameter setting information in PARTY mode has been completed (S1000). After completion of the exchange, the communications parameter setting information is saved in the area 404 (S10001). Next, communications are started based on the communications parameters stored in the area 404 (S1002). Subsequently, the digital camera 100 starts a communications service in relation to the partner with which it has exchanged communications parameters (S1003) and performs the communications service (S1004). The digital camera 100 waits for the communications service to be completed (S1005). When the service is completed, the communications parameters stored in the area 404 is cleared (S1006). This service includes various processing, which is executed via communication based on communication parameters stored in the area 404, such as processing that the printer 101 prints an image received from the digital camera 100, and exchange processing of image between the digital cameras 100 and 102.

Thus, in the case of communications parameter setting information which combines a one-time service ticket, once service is performed, the communications parameter setting information is erased, making it impossible to conduct a next communications session. Consequently the service no longer can be started. This makes it possible to implement a one-time service.

Next, as a fourth method, description will be given of a method for clearing the communications parameter setting information when new communications parameter setting information is stored, in a case where the communications parameter setting information has been held as temporary communications parameters of the digital camera 100.

FIG. 11 is a flowchart showing the process of achieving temporality by exchanging and holding communications parameter setting information again in PARTY mode. First, the digital camera 100 checks whether exchange of communications parameter setting information in PARTY mode has been completed (S1100). After completion of the exchange, the communications parameter setting information is saved in the area 404 (S1101). Next, the digital camera 100 starts communications based on the communications parameters stored in the area 404 and performs a communications service in relation to the partner with which it has exchanged communications parameters (S1102). After the service is finished, if exchange of communications parameter setting information in PARTY mode is specified as the operation mode (S1103), the digital camera 100 exchanges communications parameter setting information again. When the exchange is completed (S1104), the area 404 is cleared (S1105). The accepted new communications parameter setting information is stored in the area 404 (S1106).

Consequently, the digital camera 100 can conduct communications any number of times easily with the communications partner with which it has exchanged parameters once in PARTY mode until it enters PARTY mode the next time.

Next, description will be given of a case in which the printer 101 exchanges communications parameter setting information in AUTO mode, and then exchanges communications parameter setting information in PARTY mode during communications.

Figure 12:
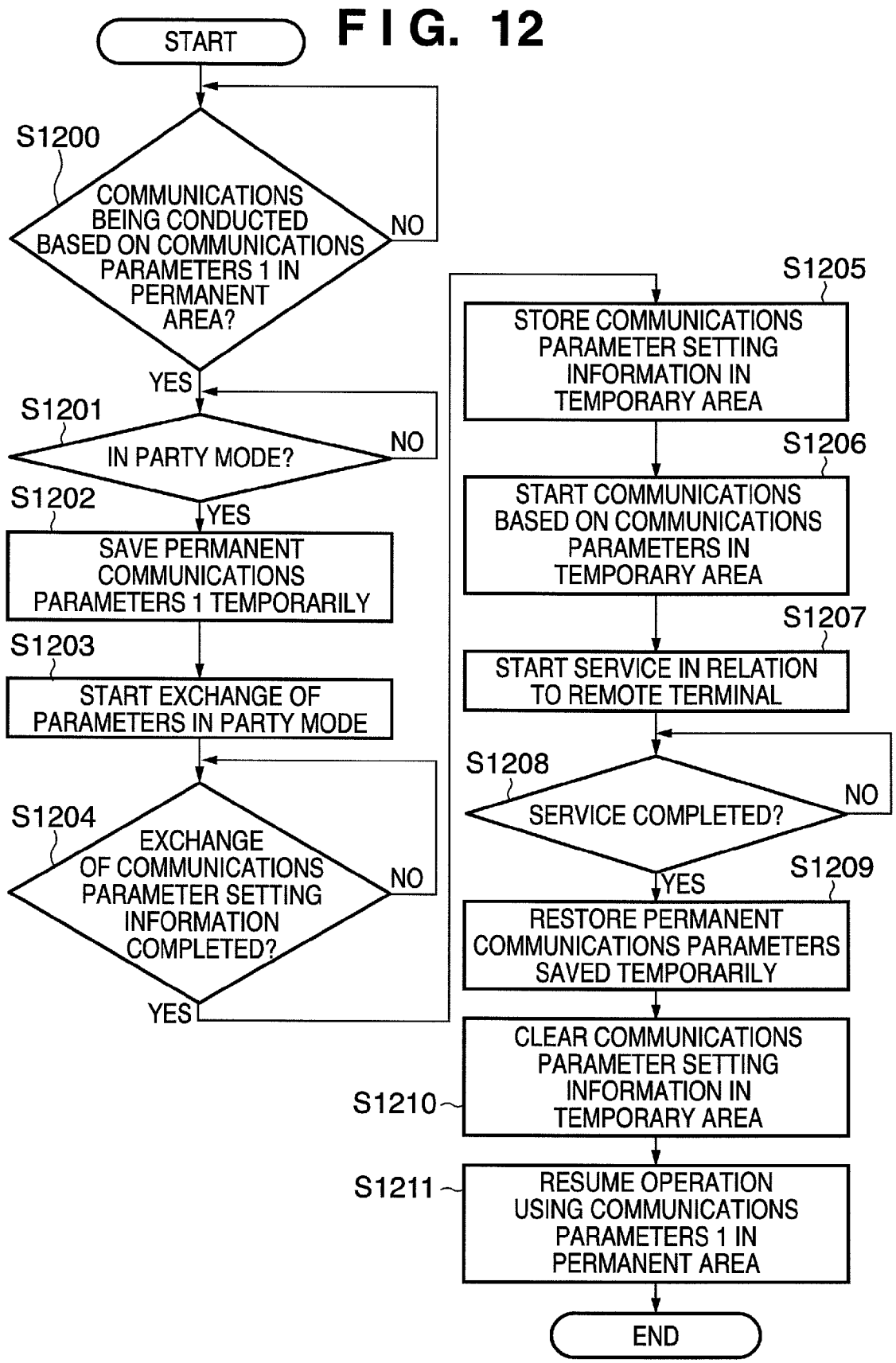
FIG. 12 is a flowchart showing the process of achieving temporality of communications parameter setting information by changing the operation mode.

FIG. 12 is a flowchart showing the process of achieving temporality by changing the operation mode. First, the communications parameter setting start button 104 is pressed when the printer 101 is conducting communications using the communications parameter setting information stored in a permanent communications parameter area (S1200). When PARTY operation mode is set (S1201), the printer 101 temporarily saves the permanent communications parameters used for regular communications (S1202). At the same time, the printer 101 starts exchange of communications parameter setting information in PARTY mode (S1203) and waits for the exchange to be completed (S1204).

Subsequently, when the exchange is completed, the printer 101 saves the PARTY-mode communications parameter setting information in a temporary area (S1205) and starts communications using the communications parameters (S1206). Then, the printer 101 performs a communications service in relation to the partner with which it has exchanged communications parameters (S1207). After the service is finished (S1208), the printer 101 restores the permanent communications parameters saved temporarily (S1209). The printer 101 clears the communications parameter setting information stored in the temporary area (S1210) and resumes operation using the communications parameters in the permanent area (S1211).

Thus, when a user regularly uses a printer included in a network constructed in a fixed fashion at home, even if the printer is used temporarily by another user, the original user can subsequently restore the settings of the fixed network automatically. On the other hand, the user who wants to use the printer temporarily can perform services by exchanging communications parameter setting information in PARTY mode.

Second Embodiment

Next, a second embodiment of the present invention will be described in detail below with reference to the drawings. In the second embodiment, description will be given of a case in which security levels contained in communications parameter setting information is controlled in operation mode.

Figure 13:
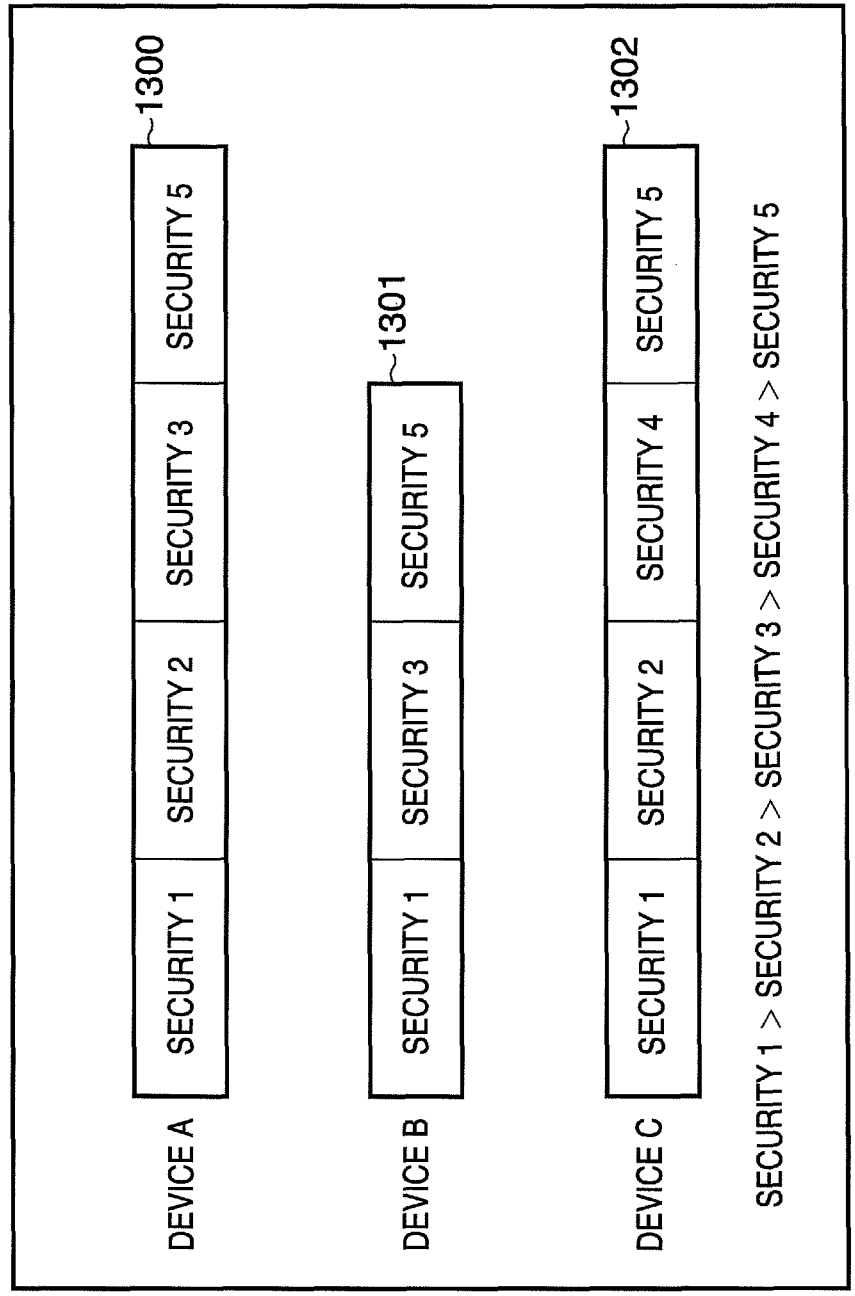
FIG. 13 is a diagram showing security levels available for each device.

FIG. 13 is a diagram showing security levels available for each device. In FIG. 13, the tightness of security decreases in the order: security 1>security 2>security 3>security 4>security 5. In the example of FIG. 13, the security levels available for device A are securities 1, 2, 3, and 5. The security levels available for device B are securities 1, 3, and 5. The security levels available for device C are securities 1, 2, 4, and 5. The highest of the security levels common to all the devices is security 1, and the lowest security level is security 5.

Now, detailed description will be given of how to ensure security and increase safety while maintaining interconnectability among multiple devices by changing the tightness of security depending on the operation mode.

First, description will be given of a case in which communications parameter setting information is exchanged by selecting a security level according to the operation mode and setting the selected security level on the communications parameter setting information.

Figure 14:
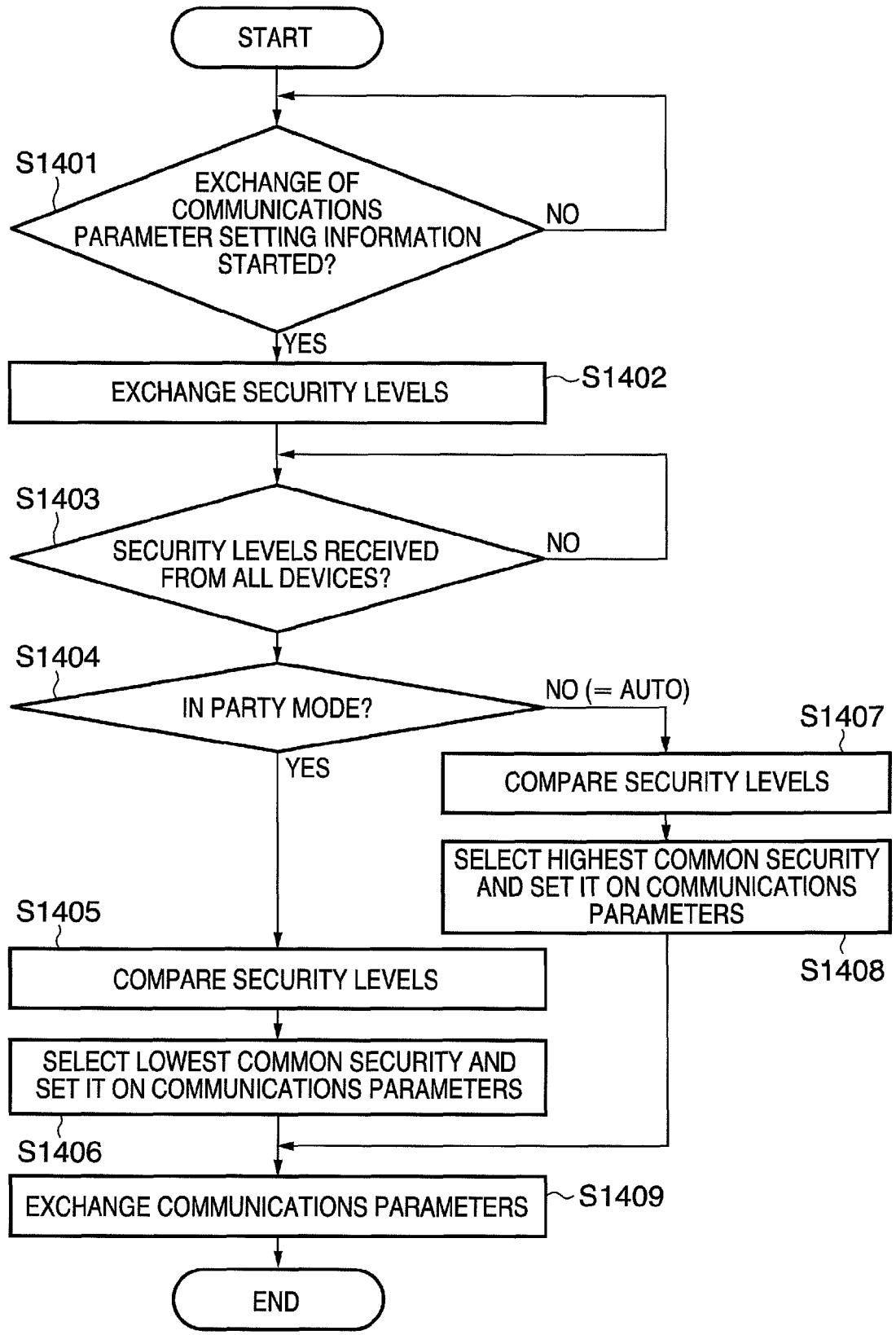
FIG. 14 is a flowchart showing the process of determining a security level depending on whether the operation mode is AUTO or PARTY.

FIG. 14 is a flowchart showing the process of determining a security level depending on whether the operation mode is AUTO or PARTY. First, the digital camera 100 starts exchange of communications parameter setting information (S1401). It exchanges security levels with other devices (S1402), and checks whether it has collected security levels from all the devices currently located on the same network (S1403). If the digital camera 100 is in PARTY operation mode (S1404: YES), it compares the collected security levels (S1405). The digital camera 100 selects the lowest security level common to all the devices and sets it on the communications parameter setting information (S1406). In this case, security 5 in FIG. 13 is selected. Then, the digital camera 100 exchanges the communications parameter setting information with all the other devices (S1409).

On the other hand, if the digital camera 100 is in AUTO operation mode, it compares the security levels (S1407), selects the highest security common to all the devices, and sets it on the communications parameter setting information (S1408). Then, the digital camera 100 exchanges the communications parameter setting information with the other devices (S1409).

That is, in AUTO mode, in which information has permanence, a high security level is selected while in PARTY mode, in which an unspecified number of people participate and parameters are temporary, a security level common to all people is selected to allow them to conduct communications. This makes it possible to balance interconnectability with security according to usage forms.

Next, description will be given of the process of determining a security level when it is desired to raise the security level even in PARTY operation mode because the communications parameter setting information includes billing information. Incidentally, although billing information is taken as an example, the description also applies to other highly confidential information.

FIG. 15 is a flowchart showing the process of determining a security level depending on the presence or absence of billing information. First, the digital camera 100 starts exchange of communications parameter setting information (S1501). It exchanges security levels with other devices (S1502), and checks whether it has collected security levels from all the devices currently located on the same network (S1503). Next, the digital camera 100 checks whether billing information is included in the communications parameter setting information (S1504). If billing information is included (S1504: YES), the digital camera 100 compares the collected security levels (S1505). The digital camera 100 selects the highest security level that will allow all users to conduct communications and sets it on the communications parameter setting information (S1506). Then, the digital camera 100 exchanges communications parameter setting information at a higher security level (S1509).

On the other hand, if no billing information is included, the digital camera 100 sets the security level according to the operation mode (S1507) as in the case of the process in FIG. 14 and sets the security corresponding to the operation mode on the communications parameter setting information (S1508). Then, the digital camera 100 exchanges the communications parameter setting information with the other devices (S1509).

This makes it possible to raise the security level even in PARTY mode when communicating highly confidential information.

A high security level is required in AUTO operation mode, and it is possible to further increase security by rejecting communications with devices which do not satisfy a certain level of security.

Other Embodiments

As another embodiment, by allowing the user to select from a plurality of methods for temporarily holding parameters in PARTY mode, it is possible to achieving temporality according to circumstances.

Although digital cameras and a printer have been cited as devices, the present invention is not limited to them and may be applied to notebook personal computers having wireless communication capability, mobile terminals, and the like.

Incidentally, the present invention may be applied either to a system consisting of two or more devices (e.g., a host computer, interface devices, readers, printers, and the like) or to an apparatus (e.g., a copying machine, facsimile machine, or the like) consisting of a single device.

Needless to say, the object of the present invention can also be achieved by a recording medium containing software program code that implements the functions of the above embodiments: it is supplied to a system or apparatus, whose computer (or CPU or MPU) then reads the program code out of the storage medium and executes it.

In that case, the program code itself read out of the recording medium will implement the functions of the above embodiments, and the recording medium which stores the program code will constitute the present invention.

Available recording media for use to supply the program code include, for example, a flexible disk, hard disk, optical disk, magneto-optical disk, CD-ROM, CD-R, magnetic tape, non-volatile memory card, ROM, or the like.

Needless to say, the functions of the above embodiments may be implemented not only by the program code read out and executed by the computer, but also by part or all of the actual processing executed, in accordance with instructions from the program code, by an OS (operating system) running on the computer.

Furthermore, needless to say, the functions of the above embodiments may also be implemented by part or all of the actual processing executed by a CPU or the like contained in a function expansion card inserted into the computer or a function expansion unit connected to the computer if the processing is performed in accordance with instructions from the program code that has been read out of the storage medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-077401, filed Mar. 20, 2006, which is hereby incorporated by reference herein in its entirety.

The invention claimed is:

1. A communication apparatus which sets communication parameters, comprising:
a CPU programmed to perform the functions of
a selection unit configured to select either a first operation mode for sharing communication parameters, which are for forming a wireless network, between the communication apparatus and another communication apparatus or a second operation mode for sharing communication parameters, which are for forming a wireless network, among the communication apparatus and a plurality of other communication apparatuses; and
a control unit configured to control the communication parameters set in the communication apparatus by a different management method in accordance with the operation mode selected by said selection unit,
wherein, in a case that the communication apparatus is instructed to operate in the second operation mode after the communication apparatus set first communication parameters shared in the first operation mode, a wireless network is formed using the second communication parameter shared in the second operation mode and the setting of the first communication parameter is temporarily released, and then, in a case that a communication over the wireless network formed using the second communication parameter is completed, the communication apparatus sets the first communication parameters again.

2. The communication apparatus according to claim 1, wherein said control unit changes, as the different management method, storage areas used to store the communication parameters, in accordance with the selected first or second operation mode.

3. The communication apparatus according to claim 1, wherein said control unit manages, as temporary stored communication parameters, the communication parameters to be set to the communication apparatus, in the second operation mode.

4. The communication apparatus according to claim 3, wherein said control unit erases communication parameters managed as temporary stored information when said communication apparatus is powered on or off.

5. The communication apparatus according to claim 3, wherein said control unit erases communication parameters managed as temporary stored information when a predetermined period expires.

6. The communication apparatus according to claim 3, wherein said control unit erases communication parameters managed as temporary stored information when a service is performed on a network corresponding to the communication parameters.

7. The communication apparatus according to claim 3, wherein, in the second operation mode, said control unit continues to store communication parameters managed as the temporary stored information until new communication parameters are set.

8. The communication apparatus according to claim 3, wherein said control unit manages communication parameters set in the first operation mode as permanent stored information, and manages communication parameters set in the second operation mode as temporary stored information.

9. The communication apparatus according to claim 3, wherein said control unit changes storage areas used for storing the communication parameters in accordance with the first or second operation mode selected by said selection unit.

10. The communication apparatus according to claim 1, wherein the CPU is further programmed to perform the function of:
an exchange unit configured to exchange security level information when setting the communication parameters, and wherein
said control unit changes a security setting of the communication parameters according to the exchanged security level information and the selected operation mode.

11. The communication apparatus according to claim 10, wherein regarding the security setting, the highest common security level is set in the first operation mode and the lowest common security level is set in the second operation mode.

12. The communication apparatus according to claim 1, wherein said control unit controls the communication parameters set in the first operation mode so as to be deleted by a user action and the communication parameters set in the second operation mode so as to be automatically deleted.

13. The communication apparatus according to claim 1, wherein said control unit controls the communication parameters shared in the second operation mode so as to be deleted in accordance with completion of a communication session.

14. The communication apparatus according to claim 13, wherein the communication session is completed by the completion of a communication service.

15. The communication apparatus according to claim 13, wherein the communication session is completed in response to an instruction of power off of the communication apparatus.

16. The communication apparatus according to claim 13, wherein the communication session is completed by the expiration of a predetermined time period.

17. The communication apparatus according to claim 13, wherein the communication session is completed when communication parameters are newly set.

18. The communication apparatus according to claim 1, wherein said control unit changes a time period for storing the communication parameters according to the operation mode.

19. A communication apparatus which sets communication parameter information, comprising:
a CPU programmed to perform the functions of
a selection unit configured to select one of a first operation mode in which communication parameter information is set in relation to a specific communication apparatus and a second operation mode in which communication parameter information is set in relation to an unspecified number of communication apparatuses; and
a control unit configured to control security of the communication parameter information which is set in relation to the specific communication apparatus or the unspecified number of communication apparatuses, in accordance with the operation mode selected by said selection unit,
wherein said control unit manages the communication parameter information as either permanent stored information or temporary stored information, in accordance with the selected operation mode, and
wherein, when setting second communication parameter information in the second operation mode, after forming a network using first communication parameter information set in the first operation mode, a network is formed using the second communication parameter information with the first communication parameter information being saved temporarily, and then a wireless network is formed using the first communication parameter information again.

20. A communication apparatus which sets communication parameter information, comprising:
a CPU programmed to perform the functions of
a selection unit configured to select one of a first operation mode in which communication parameter information is set in relation to a specific communication apparatus and a second operation mode in which communication parameter information is set in relation to an unspecified number of communication apparatuses;
a control unit configured to control security of the communication parameter information which is set in relation to the specific communication apparatus or the unspecified number of communication apparatus, in accordance with the operation mode selected by said selection unit; and
an exchange unit configured to exchange security level information when setting the communication parameter information, wherein said control unit controls security of the communication parameter information according to the exchanged security level information and the selected operation mode,
wherein the security of the communication parameter information in the first operation mode is controlled by setting the highest common security level when specific additional information is included in the communication parameter information and setting the lowest common security level when no additional information is included in the communication parameter information.

21. A control method for a communication apparatus which sets communication parameters, comprising:
selecting either a first operation mode for sharing communication parameters, which are for forming a wireless network, between the communication apparatus and another communication apparatus or a second operation mode for sharing communication parameters, which are for forming a wireless network, among the communication apparatus and a plurality of other communication apparatuses; and
controlling the communication parameters set in the communication apparatus by a different management method, in accordance with the operation mode selected in said selection step,
wherein, in a case that the communication apparatus is instructed to operate in the second operation mode after the communication apparatus set first communication parameters shared in the first operation mode, a wireless network is formed using the second communication parameter shared in the second operation mode and the setting of the first communication parameter is temporarily released, and then, in a case that a communication over the wireless network formed using the second communication parameter is completed, the communication apparatus sets the first communication parameters again.

22. A program which is recorded on a non-transitory computer-readable recording medium and makes a computer perform a control method for a communication apparatus that sets communication parameters, the method comprising the steps of:
selecting either a first operation mode for sharing communication parameters, which are for forming a wireless network, between the communication apparatus and another communication apparatus or a second operation mode for sharing communication parameters, which are for forming a wireless network, among the communication apparatus and a plurality of other communication apparatuses; and
controlling the communication parameters set in the communication apparatus by a different management method, in accordance with the operation mode selected in said selection step,
wherein, in a case that the communication apparatus is instructed to operate in the second operation mode after the communication apparatus set first communication parameters shared in the first operation mode, a wireless network is formed using the second communication parameter shared in the second operation mode and the setting of the first communication parameter is temporarily released, and then, in a case that a communication over the wireless network formed using the second communication parameter is completed, the communication apparatus sets the first communication parameters again.

23. A non-transitory computer-readable recording medium containing a program which makes a computer perform a control method for a communication apparatus that sets communication parameters, the method comprising the steps of:
selecting either a first operation mode for sharing communication parameters, which are for forming a wireless network, between the communication apparatus and another communication apparatus or a second operation mode for sharing communication parameters, which are for forming a wireless network, among the communication apparatus and a plurality of other communication apparatuses; and
controlling the communication parameters set in the communication apparatus by a different management method, in accordance with the operation mode selected in said selection step,
wherein, in a case that the communication apparatus is instructed to operate in the second operation mode after the communication apparatus set first communication parameters shared in the first operation mode, a wireless network is formed using the second communication parameter shared in the second operation mode and the setting of the first communication parameter is temporarily released, and then, in a case that a communication over the wireless network formed using the second communication parameter is completed, the communication apparatus sets the first communication parameters again.

24. A communication apparatus which sets communication parameter information, comprising:
a CPU programmed to perform the functions of
a selection unit configured to select either a first operation mode in which communication parameter information is set to be shared between the communication apparatus and another communication apparatus or a second operation mode in which the communication parameter information is set to be shared among the communication apparatus and other communication apparatuses;
a control unit configured to control the communication parameter information to be set to the communication apparatus by a different management method or a different setting method in accordance with the first or second operation mode selected by said selection unit; and
a communication parameter control unit configured so that, when setting second communication parameter information in the second operation mode, after forming a network using first communication parameter information set in the first operation mode, a network is formed using the second communication parameter information with the first communication parameter information being saved temporarily, and then a wireless network is formed using the said first communication parameter information again.

25. A control method for a communication apparatus which sets communication parameter information, comprising:
   selecting either a first operation mode in which communication parameter information is set to be shared between the communication apparatus and another communication apparatus or a second operation mode in which the communication parameter information is set to be shared among the communication apparatus and other communication apparatuses;
   controlling the communication parameter information to be set to the communication apparatus by a different management method or a different setting method in accordance with the first or second operation mode selected in said selection step; and
   when setting second communication parameter information in the second operation mode, after forming a network using first communication parameter information set in the first operation mode, forming a network using the second communication parameter information with the first communication parameter information being saved temporarily, and then forming a wireless network using the said first communication parameter information again.

26. A non-transitory computer-readable recording medium containing a program which makes a computer perform a control method for a communication apparatus that sets communication parameters, the method comprising:
   selecting either a first operation mode in which communication parameter information is set to be shared between the communication apparatus and another communication apparatus or a second operation mode in which the communication parameter information is set to be shared among the communication apparatus and other communication apparatuses;
   controlling the communication parameter information to be set to the communication apparatus by a different management method or a different setting method in accordance with the first or second operation mode selected in said selection step; and
   when setting second communication parameter information in the second operation mode, after forming a network using first communication parameter information set in the first operation mode, forming a network using the second communication parameter information with the first communication parameter information being saved temporarily, and then forming a wireless network using the said first communication parameter information again.

27. A communication apparatus comprising:
   a CPU programmed to perform the functions of
      a selection unit configured to select either a first operation mode which targets another communication apparatus or a second operation mode which targets a plurality of other communication apparatuses; and
      a setting unit configured to set communication parameters shared between the communication apparatus and the targeted communication apparatus in accordance with the first or second operation mode selected by said selection unit, the communication parameters being for forming a wireless network,
   wherein the communication parameters set by said setting unit differ from each other in the first and second operation modes and
   wherein, in a case that the communication apparatus is instructed to operate in the second operation mode after the communication apparatus set first communication parameters shared in the first operation mode, a wireless network is formed using the second communication parameter shared in the second operation mode, and the setting of the first communication parameter is temporarily released, and then, in a case that a communication over the wireless network formed using the second communication parameter is completed, the communication apparatus sets the first communication parameters again.

28. The communication apparatus according to claim 27, wherein the setting unit sets, as temporary stored communication parameters, the communication parameters set in the second operation mode.

29. The communication apparatus according to claim 27, wherein the communication parameters set in the second operation mode are automatically deleted.

30. The communication apparatus according to claim 27, further comprising a clearing unit configured to clear the communication parameters set in the second operation mode in accordance with completion of a communication session.

31. The communication apparatus according to claim 30, wherein the communication session is completed by the completion of a communication service.

32. The communication apparatus according to claim 30, wherein the communication session is completed in response to an instruction of power off of the communication apparatus.

33. The communication apparatus according to claim 30, wherein the communication session is completed by the expiration of a predetermined time period.

34. The communication apparatus according to claim 30, wherein the communication session is completed when communication parameters are newly set by said first setting unit.

35. The communication apparatus according to claim 27, wherein said setting unit sets communication parameters that a security setting of the communication parameters is changed in accordance with the first or second operation mode.

36. A control method for a communication apparatus, the method comprising:
   selecting either a first operation mode which targets another communication apparatus or a second operation mode which targets a plurality of other communication apparatuses; and
   setting communication parameters shared between the communication apparatus and the targeted communication apparatus in accordance with the first or second operation mode selected in the selection step, the communication parameters being for forming a wireless network,
   wherein the communication parameters set in the setting step differ from each other in the first and second operation modes and
   wherein, in a case that the communication apparatus is instructed to operate in the second operation mode after the communication apparatus set first communication parameters shared in the first operation mode, a wireless network is formed using the second communication parameter shared in the second operation mode, and the setting of the first communication parameter is temporarily released, and then, in a case that a communication over the wireless network formed using the second communication parameter is completed, the communication apparatus sets the first communication parameters again.

37. A program which is recorded on a non-transitory computer-readable recording medium and makes a computer perform a control method for a communication apparatus that sets communication parameters, the method comprising:
selecting either a first operation mode which targets another communication apparatus or a second operation mode which targets a plurality of other communication apparatuses; and
setting communication parameters shared between the communication apparatus and the targeted communication apparatus in accordance with the first or second operation mode selected in the selection step, the communication parameters being for forming a wireless network,
wherein the communication parameters set in the setting step differ from each other in the first and second operation modes and
wherein, in a case that the communication apparatus is instructed to operate in the second operation mode after the communication apparatus set first communication parameters shared in the first operation mode, a wireless network is formed using the second communication parameter shared in the second operation mode, and the setting of the first communication parameter is temporarily released, and then, in a case that a communication over the wireless network formed using the second communication parameter is completed, the communication apparatus sets the first communication parameters again.

38. A communication apparatus comprising:
a CPU programmed to perform the functions of
a first setting unit configured to execute first communication parameter setting processing for setting wireless communication parameters to be shared between the communication apparatus and another communication apparatus;
a second setting unit configured to execute second communication parameter setting processing for setting wireless communication parameters to be shared among the communication apparatus and a plurality of other communication apparatuses; and
a control unit configured to control the communication parameters set to the communication apparatus by a different management method in accordance with whether the communication parameters are set by the first setting unit or by the second setting unit,
wherein, in a case that the communication apparatus is instructed to execute the second communication parameter setting processing after the communication apparatus set first communication parameters shared by the first setting unit, a wireless network is formed using the second communication parameter shared by the second setting unit and the setting of the first communication parameter is temporarily released, and then, in a case that a communication over the wireless network formed using the second communication parameter is completed, the communication apparatus sets the first communication parameters again.

39. A communication apparatus, comprising:
a CPU programmed to perform the functions of
a first setting unit configured to execute first wireless communication parameter setting processing for setting credentials for wireless communication to be shared between the communication apparatus and another communication apparatus;
a second setting unit configured to execute second communication parameter setting processing for setting credentials for wireless communication to be shared among the communication apparatus and a plurality of other communication apparatuses;
an allowance unit configured to allow the communication apparatus to establish a one-time session using the credentials set by the second setting unit and to prevent reuse of the credentials set by the second setting unit in next-time session,
wherein, in a case that the communication apparatus is instructed to execute the second communication parameter setting processing after the communication apparatus set first communication parameters shared by the first setting unit, a wireless network is formed using the second communication parameter shared by the second setting unit and the setting of the first communication parameter is temporarily released, and then, in a case that a communication over the wireless network formed using the second communication parameter is completed, the communication apparatus sets the first communication parameters again.

40. A control method for a communication apparatus comprising:
executing first communication parameter setting processing for setting wireless communication parameters to be shared between the communication apparatus and another communication apparatus;
executing second communication parameter setting processing for setting wireless communication parameters to be shared among the communication apparatus and a plurality of other communication apparatuses; and
controlling the communication parameters set to the communication apparatus by a different management method in accordance with whether the communication parameters are set in the first communication parameter setting processing or in the second communication parameter setting processing,
wherein, in a case that the communication apparatus is instructed to execute the second communication parameter setting processing after the communication apparatus set first communication parameters shared by the first communication parameter setting processing, a wireless network is formed using the second communication parameter shared by the second communication parameter setting processing and the setting of the first communication parameter is temporarily released, and then, in a case that a communication over the wireless network formed using the second communication parameter is completed, the communication apparatus sets the first communication parameters again.

41. A control method for a communication apparatus, comprising:
executing first wireless communication parameter setting processing for setting credentials for wireless communication to be shared between the communication apparatus and another communication apparatus;
executing second communication parameter setting processing for setting credentials for wireless communication to be shared among the communication apparatus and a plurality of other communication apparatuses;

allowing the communication apparatus to establish a one-time session using the credentials set in the second communication parameter setting processing and to prevent reuse of the credentials set in the second communication parameter setting processing in a next-time session, wherein, in a case that the communication apparatus is instructed to execute the second communication parameter setting processing after the communication apparatus set first communication parameters shared by the first communication parameter setting processing, a wireless network is formed using the second communication parameter shared by the second communication parameter setting processing and the setting of the first communication parameter is temporarily released, and then, in a case that a communication over the wireless network formed using the second communication parameter is completed, the communication apparatus sets the first communication parameters again.

42. A non-transitory computer-readable recording medium containing a program for causing a computer to execute a control method for a communication apparatus that sets communication parameters, the method comprising:

executing first communication parameter setting processing for setting wireless communication parameters to be shared between the communication apparatus and another communication apparatus;

executing second communication parameter setting processing for setting wireless communication parameters to be shared among the communication apparatus and a plurality of other communication apparatuses; and controlling the communication parameters set to the communication apparatus by a different management method in accordance with whether the communication parameters are set in the first communication parameter setting processing or in the second communication parameter setting processing, wherein, in a case that the communication apparatus is instructed to execute the second communication parameter setting processing after the communication apparatus set first communication parameters shared by the first communication parameter setting processing, a wireless network is formed using the second communication parameter shared by the second communication parameter setting processing and the setting of the first communication parameter is temporarily released, and then, in a case that a communication over the wireless network formed using the second communication parameter is completed, the communication apparatus sets the first communication parameters again.

43. A non-transitory computer-readable recording medium containing a program for causing a computer to execute a control method for a communication apparatus that sets communication parameters, the method comprising:

executing first wireless communication parameter setting processing for setting credentials for wireless communication to be shared between the communication apparatus and another communication apparatus;

executing second communication parameter setting processing for setting credentials for wireless communication to be shared among the communication apparatus and a plurality of other communication apparatuses;

allowing the communication apparatus to establish a one-time session using the credentials set in the second communication parameter setting processing and to prevent reuse of the credentials set in the second communication parameter setting processing in a next-time session, wherein, in a case that the communication apparatus is instructed to execute the second communication parameter setting processing after the communication apparatus set first communication parameters shared by the first communication parameter setting processing, a wireless network is formed using the second communication parameter shared by the second communication parameter setting processing and the setting of the first communication parameter is temporarily released, and then, in a case that a communication over the wireless network formed using the second communication parameter is completed, the communication apparatus sets the first communication parameters again.

* * * * *